US009542725B2

(12) United States Patent
Shibata et al.

(10) Patent No.: US 9,542,725 B2
(45) Date of Patent: Jan. 10, 2017

(54) IMAGE PROCESSING DEVICE, IMAGE PROCESSING METHOD AND MEDIUM

(71) Applicant: NEC Corporation, Minato-ku, Tokyo (JP)

(72) Inventors: Takashi Shibata, Tokyo (JP); Akihiko Iketani, Tokyo (JP); Shuji Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/647,531

(22) PCT Filed: Nov. 28, 2013

(86) PCT No.: PCT/JP2013/007001
§ 371 (c)(1),
(2) Date: May 27, 2015

(87) PCT Pub. No.: WO2014/083857
PCT Pub. Date: Jun. 5, 2014

(65) Prior Publication Data
US 2015/0317767 A1   Nov. 5, 2015

(30) Foreign Application Priority Data
Nov. 29, 2012   (JP) .................. 2012-260844

(51) Int. Cl.
G06K 9/40   (2006.01)
G06T 3/40   (2006.01)
H04N 1/407  (2006.01)

(52) U.S. Cl.
CPC ............. *G06T 3/4053* (2013.01); *H04N 1/407* (2013.01)

(58) Field of Classification Search
USPC ........ 382/254, 153, 155, 159, 173, 190; 1/1; 435/6.1, 6.18, 91.2
See application file for complete search history.

(56) References Cited

U.S. PATENT DOCUMENTS 7,767,315 B2 * 8/2010 Kathirgamanathan . C09K 11/06
                                                        252/301.16
8,180,146 B2 * 5/2012 Ngan ................ G06K 9/00704
                                                        382/153

(Continued)

FOREIGN PATENT DOCUMENTS

| JP | 2005-334402 A | 12/2005 |
|----|---------------|---------|
| JP | 2008167027 A  | 7/2008  |
| JP | 2011-180798 A | 9/2011  |
| WO | 2004/068862 A1 | 8/2004 |

OTHER PUBLICATIONS

International Search Report for PCT Application No. PCT/JP2013/007001, mailed on Feb. 10, 2014.

(Continued)

*Primary Examiner* — Anh Do

(57) ABSTRACT

An image processing device according to the present invention includes: a weight calculation unit that determines an area where a feature value of an input image is saved, based on a gradient of a feature value of a pixel of the input image and a direction of the gradient, and calculates a weight for reducing a regularization constraint that is a constraint based on regularization of image processing in the area where the feature value is saved; a regularization term calculation unit that calculates a regularization constraint of a high resolution image restored based on the input image by using the weight; a reconstruction constraint calculation unit that calculates a reconstruction constraint that is a constraint based on reconstruction of the high resolution image; and an image restoring unit that restores the high resolution image from the input image based on the regularization constraint and the reconstruction constraint.

11 Claims, 8 Drawing Sheets

(56) References Cited

U.S. PATENT DOCUMENTS

| | | | |
|---|---|---|---|
| 8,605,995 B2* | 12/2013 | Kameyama | G06T 3/4053 |
| | | | 382/155 |
| 8,913,831 B2* | 12/2014 | Bergman | 382/173 |
| 9,117,133 B2* | 8/2015 | Barnes | A61B 5/0059 |
| 2006/0038891 A1 | 2/2006 | Okutomi et al. | |

OTHER PUBLICATIONS

Michael K. Ng, Huanfeng Shen, Edmund Y. Lam, and Liangpei Zhang, "A Total Variation Regularization Based Super-Resolution Reconstruction Algorithm for Digital Video", EURASIP Journal on Advances in Signal Processing, vol. 2007, Article ID 74585, 16 pages.

Farsiu, S.; Robinson, M.D.; Elad, M.; Milanfar, P. "Fast and robust multiframe super resolution" IEEE Transactions on Image Processing, vol. 13, Issue 10, 2004, pp. 1327-1344.

English translation of written opinion for PCT Application No. PCT/JP2013/007001.

Jeong-Ho Shin et al. "Adaptive regularized image interpolation using data fusion and steerable constraints", PROC. SPIE 4310, Visual Communication and Image Processing, Dec. 29, 2000, pp. 798-809, XP55284110.

Marr D et al., "Theory of Edge Detection", Proceedings of the Royal Society of London. B, London, GB, vol. 207, Jan. 1, 1980, pp. 187-217, XP000865964, ISSN:0080-4649.

Guy Demoment, "Image Reconstruction and Restoration: Overview of Common Estimationstructures and Problems", IEEE Transactions on Acoustics, Speech and Signal Processings, IEEE Inc., New York, vol. 37, No. 12, Dec. 1, 1989, pp. 2024-2036, XP000099505.

Charbonnier P et al., "Deterministic Edge-Preserving Regularization in Computed Imaging", IEEE Transactions on Image Processing, IEEE Inc. New York, vol. 6, No. 2, Feb. 1, 1997, pp. 298-311, XP000642468.

Extended European Search Report for EP Application No. EP13857754.9 dated Jul. 15, 2016.

* cited by examiner

IMAGE PROCESSING DEVICE, IMAGE PROCESSING METHOD AND MEDIUM

This application is a National Stage Entry of PCT/JP2013/007001 filed on Nov. 28, 2013, which claims priority from Japanese Patent Application 2012-260844 filed on Nov. 29, 2012, the contents of all of which are incorporated herein by reference, in their entirety.

TECHNICAL FIELD

The present invention relates to image processing, and particularly, relates to an image processing device and an image processing method for enhancing resolution of an image.

BACKGROUND ART

An image captured by an image-capturing device is evolving from an image on a film medium into digital data.

An image on digital data can be processed more easily than an image on a film medium. For this reason, an image on digital data is processed using various image processing devices.

Super resolution processing is known as one of such processing (for example, see PLT 1).

The super resolution processing is processing for generating an image of which resolution is high (high resolution image) based on an image of which resolution is low (input image).

The super resolution technique includes the following techniques.

The first super resolution technique is a reconstruction based super resolution technique described in PLT 1.

In general, an input image is processed in a deteriorate process (for example, blur or low resolution process), so that resolution of the input image is decreased.

Therefore, in the reconstruction based super resolution technique, the deteriorate process is reconstructed for the input image, so that a high resolution image is generated.

However, a plurality of types of processes can be considered as the deteriorate process. Therefore, in the reconstruction based super resolution technique, a plurality of candidates (or solutions) of high resolution images can be calculated. Therefore, in the reconstruction based super resolution technique, constraint conditions are used to narrow down candidates (solutions) of high resolution images reconstructed.

In the reconstruction based super resolution technique, a plurality of constraint conditions can be set.

In this case, typical constraint conditions will be described.

A first constraint condition is a constraint condition based on reconstruction (hereinafter referred to as "reconstruction constraint"). More specifically, the reconstruction constraint is a constraint determined based on relationship between an input image and a reconstructed high resolution image (for example, difference between an image obtained by deteriorating a high resolution image and an input image) or an amount of processing for reconstruction.

A second constraint condition is a constraint based on appropriateness of the high resolution image itself. More specifically, this constraint condition is a constraint based on regularity of a matrix of a high resolution image (this constraint condition will be hereinafter referred to as "regularization constraint"). For example, in the reconstruction based super resolution technique, a regularization term is added based on Bayes' theorem (prior probability). In this case, the regularization constraint is a constraint determined based on the added regularization term.

Then, in the reconstruction based super resolution technique, candidates (solutions) of high resolution images are narrowed down based on the reconstruction constraint and the regularization constraint. In the reconstruction based super resolution technique, each constraint is calculated as a cost in actual processing, so that the determination may be performed so as to minimize the total cost.

A second super resolution technique is a learning based super resolution technique. In the learning based super resolution technique, a dictionary is generated in advance based on relationship between a learning high resolution image and a low resolution image. The learning based super resolution technique is a technique for generating a high resolution image from an input image by using the dictionary. In this case, the dictionary may be referred to as previous knowledge. Therefore, the learning based super resolution technique may be described as employing previous knowledge as a constraint condition of a solution.

In the reconstruction based super resolution technique, a reconstruction constraint calculated using an input image is used. On the other hand, in the learning based super resolution technique, a dictionary generated based on relationship between a learning high resolution image and a low resolution image is used. The image processing device can also generate a super resolution image by replacing the reconstruction constraint of the reconstruction based super resolution technique with processing based on the dictionary of the learning based super resolution technique, and by using a regularization constraint of the reconstruction based super resolution technique. Therefore, in the description below, unless otherwise specified, the reconstruction based super resolution technique is described as a super resolution technique including the learning based super resolution technique. Unless otherwise specified, the reconstruction constraint can be replaced with processing based on the dictionary as necessary.

FIG. 8 is a block diagram illustrating an example of a configuration of an image processing device 90 restoring a general super resolution image by using the technique described in PLT 1.

The image processing device 90 includes a reconstruction constraint calculation unit 910, a regularization term calculation unit 920, and an image restoring unit 930.

The reconstruction constraint calculation unit 910 calculates a reconstruction constraint, that is, a cost of reconstruction.

The regularization term calculation unit 920 calculates a constraint based on regularization (regularization constraint), that is, a cost based on regularization.

The regularization term calculation unit 920 of the image processing device 90 using the super resolution technique described in PLT 1 uses, for example, TV (Total Variation) as regularization (for example, see NPL 1). The TV is a method of regularization for minimizing summation of absolute values of differences of pixel values between adjacent pixels.

Alternatively, the regularization term calculation unit 920 may use BTV (Bilateral Total Variation) (for example, see NPL 2). The BTV is a method of regularization for minimizing summation value of absolute values of differences of pixel values between not only adjacent pixels but pixels in the vicinity. However, in the BTV, the summation is derived after an absolute value of the difference is multiplied by an attenuation coefficient based on a position of a pixel.

The image restoring unit 930 generates (restores), as a restored image, a super resolution image for minimizing summation of the cost of reconstruction and the cost of regularization.

As described above, the image processing device 90 using a general super resolution technique restores a high resolution image of which resolution is increased in view of the reconstruction constraint and the regularization constraint.

CITATION LIST

[Patent Literature]
[PLT 1] Japanese Patent Laid-Open No. 2011-180798.
[Non Patent Literature]
[NPL 1] Michael K. Ng, Huanfeng Shen, Edmund Y. Lam, and Liangpei Zhang, "A Total Variation Regularization Based Super-Resolution Reconstruction Algorithm for Digital Video", EURASIP Journal on Advances in Signal Processing, Volume 2007, Article ID 74585, 16 pages.
[NPL 2] Farsiu, S.; Robinson, M. D.; Elad, M.; Milanfar, P. "Fast and robust multiframe super resolution" IEEE Transactions on Image Processing, Volume 13, Issue 10, 2004, Pages: 1327-1344.

SUMMARY OF INVENTION

Technical Problem

Areas included in an image can be classified into a plurality of types based on a feature of a pixel value.

One of the classified areas is a texture area.

The texture area is an area having such a feature that a feature value (for example, a tone of luminance) of a predetermined pixel is greatly different between adjacent pixels or pixels in the vicinity. For such the texture area, preservation of the feature value (for example, a tone) is preferable.

However, in the regularization based on TV or BTV used by the image processing device 90, the feature value is averaged (flattened) even in the area where the feature value is to be preserved such as the texture area. As a result, in the texture area, the feature value is flattened (for example, the tone of luminance is made into a lower tone).

As described above, the technique described in PLT 1 has a problem that the feature value is flattened (for example, made into a low tone) in an area where the feature value of a pixel is to be left.

It is an object of the present invention to solve the above problem and provide an image processing device and an image processing method for reducing flattening in an area where the feature value of a pixel is to be left, in restoration of a super resolution image.

Solution to Problem

An image processing device according to an aspect of the present invention includes: a weight calculation unit that determines an area where a feature value of an input image is saved, based on a gradient of a feature value of a pixel of the input image and a direction of the gradient, and calculates a weight for reducing a regularization constraint that is a constraint based on regularization of image processing in the area where the feature value is saved; a regularization term calculation unit that calculates a regularization constraint of a high resolution image restored based on the input image by using the weight; a reconstruction constraint calculation unit that calculates a reconstruction constraint that is a constraint based on reconstruction of the high resolution image; and an image restoring unit that restores the high resolution image from the input image based on the regularization constraint and the reconstruction constraint.

An image processing method according to an aspect of the present invention includes: determining an area where a feature value of an input image is saved, based on a gradient of a feature value of a pixel of the input image and a direction of the gradient, and calculating a weight for reducing a regularization constraint that is a constraint based on regularization of image processing in the area where the feature value is saved; calculating a regularization constraint of a high resolution image restored based on the input image by using the weight; calculating a reconstruction constraint that is a constraint based on reconstruction of the high resolution image; and restoring the high resolution image from the input image based on the regularization constraint and the reconstruction constraint.

A computer-readable non-transitory recording medium embodying a program for an image processing device to perform method, the method includes: determining an area where a feature value of an input image is saved, based on a gradient of a feature value of a pixel of the input image and a direction of the gradient, and calculating a weight for reducing a regularization constraint that is a constraint based on regularization of image processing in the area where the feature value is saved; calculating a regularization constraint of a high resolution image restored based on the input image by using the weight; calculating a reconstruction constraint that is a constraint based on reconstruction of the high resolution image; and restoring the high resolution image from the input image based on the regularization constraint and the reconstruction constraint.

Advantageous Effects of Invention

According to the present invention, a tone in an area where the tone is desired to be maintained can be less changed into lower when a super resolution image is restored.

DESCRIPTION OF EMBODIMENTS

[Description of Embodiments]

Figure 1:
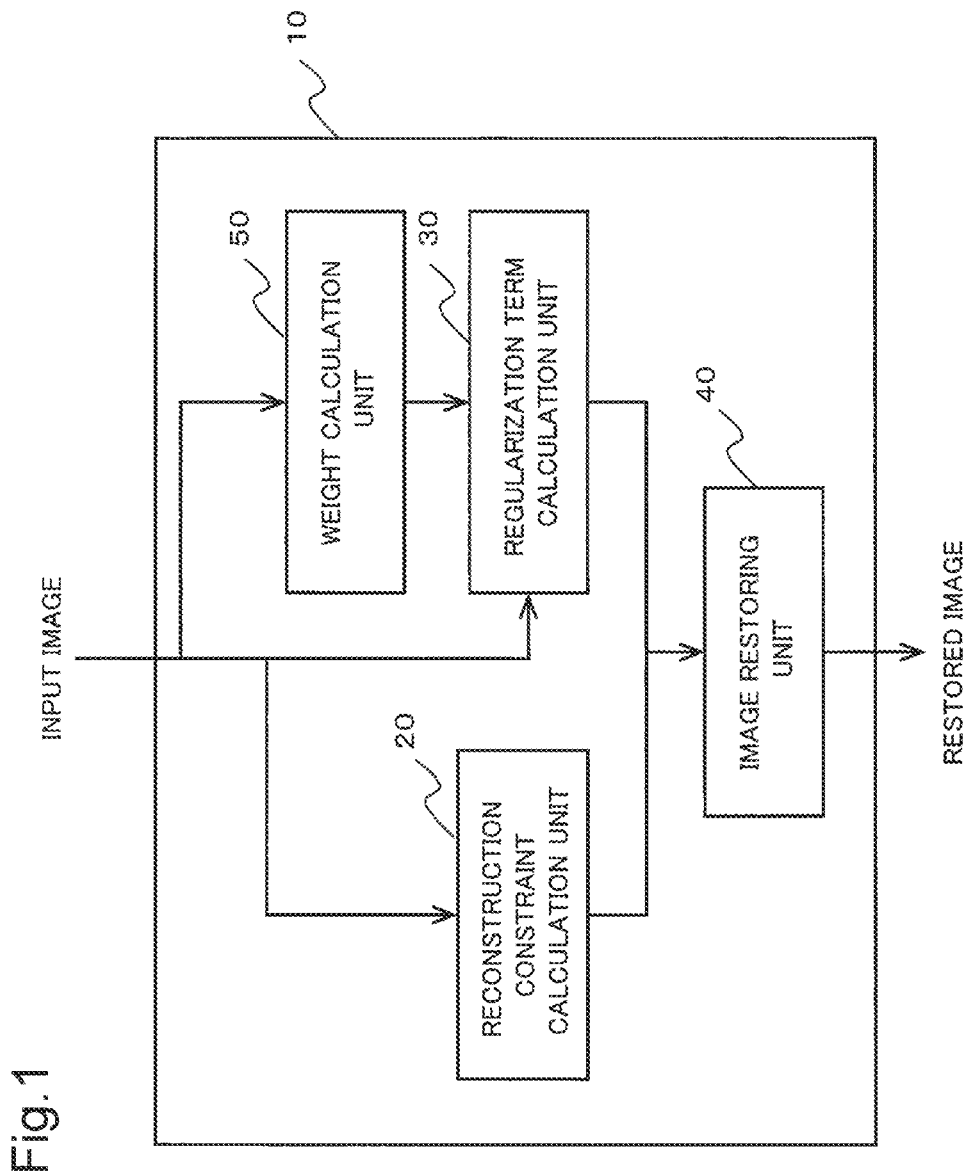
FIG. 1 is a block diagram illustrating an example of a configuration of an image processing device according to a first exemplary embodiment of the present invention.

Subsequently, exemplary embodiments of the present invention will be described with reference to drawings.

Each drawing is given to describe the exemplary embodiments of the present invention. Therefore, the present invention is not limited to description of each drawing. The same component of each drawing is denoted with the same reference numeral, and repeated description thereabout may be omitted.

(First Exemplary Embodiment)

FIG. 1 is a block diagram illustrating an example of a configuration of an image processing device 10 according to a first exemplary embodiment of the present invention.

The image processing device 10 includes a reconstruction constraint calculation unit 20, a regularization term calculation unit 30, an image restoring unit 40, and a weight calculation unit 50.

The reconstruction constraint calculation unit 20 calculates a value indicating a state of a constraint based on reconstruction (reconstruction constraint).

The reconstruction constraint calculation unit 20 according to the present exemplary embodiment is not particularly limited in the calculated value (reconstruction constraint).

For example, the reconstruction constraint calculation unit 20 may calculate, as a reconstruction constraint, a constraint so that the value (cost) becomes larger when the constraint based on reconstruction becomes larger. As an example, when blur and down-sampling of an image is considered, the reconstruction constraint calculation unit 20 may use the following numerical expression 1 to calculate a value (cost) of the reconstruction constraint.

$$\|DBX-Y\|_2^2 \qquad [\text{Expression 1}]$$

In the above, a matrix D is a down-sampling matrix, a matrix B is a blur matrix, a matrix X is a matrix of an input image, and a matrix Y is a matrix of a super resolution image (restored image). "DBX" is a product of the matrixes D, B, and X.

Of upper and lower numbers at the double line, the lower number denotes a norm and the upper number denotes an exponent. For example, the numerical expression 1 indicates "square" of "L2 norm".

The reconstruction constraint calculation unit 20 may calculate, as a reconstruction constraint, a constraint so that the value becomes smaller when the constraint based on reconstruction becomes smaller.

The regularization term calculation unit 30 calculates a value indicating a state of a constraint based on regularization (regularization constraint) in view of a weight calculated by the weight calculation unit 50 to be described later.

The regularization term calculation unit 30 is not particularly limited in the calculated value (regularization constraint). The regularization term calculation unit 30 may calculate, as a regularization constraint, a constraint so that the value becomes smaller when the constraint is larger. The regularization term calculation unit 30 may calculate, as a regularization constraint, a constraint so that the value becomes larger when the constraint is smaller.

As described above, the reconstruction constraint calculation unit 20 and the regularization term calculation unit 30 according to the present exemplary embodiment are not particularly limited in the calculated values. However, in order to simplify description in the following explanation, each constraint will be described so that the value of each constraint becomes larger when the constraint is larger.

When a constraint of which value becomes larger when the constraint is smaller is used, the image processing device 10 may switch determination of magnitude of a value in the following description.

The image restoring unit 40 selects (restores), as a restored image, a super resolution image that produces the minimum summation (summation cost) of the reconstruction constraint calculated by the reconstruction constraint calculation unit 20 and the regularization constraint calculated by the regularization term calculation unit 30.

For example, the image restoring unit 40 may select (restore), as a super resolution image, an image making the following numerical expression 2 the minimum.

$$\|DBX-Y\|_2^2 + R(X) \qquad [\text{Expression 2}]$$

The first term of the numerical expression 2 is the reconstruction constraint indicated in the numerical expression 1. The second term is the regularization constraint.

It is noted that, in this description, "restoring" includes a meaning of simply "generating" an image.

The image processing device 10 repeats the already described operation until the summation cost of the reconstruction constraint and the regularization constraint becomes the minimum in the restored image in the image restoring unit 40 or for a predetermined number of times.

The weight calculation unit 50 determines an area in which a difference (for example, a tone difference) between adjacent pixels or between pixels in the vicinity is a feature (for example, a texture area. Hereinafter, a texture area will be used in the description as an example). Then, the weight calculation unit 50 calculates a weight with which a difference between pixels in the texture area remains, and transmits the weight to the regularization term calculation unit 30.

As described earlier, the regularization term calculation unit 30 calculates the regularization term based on this weight.

Namely, the weight calculation unit 50 determines an area where the feature value is preserved, and calculates a weight that reduces a regularization constraint in that area.

When the regularization term calculation unit 30 uses a constraint of which value becomes larger when the constraint is larger (for example, a regularization constraint), the weight calculation unit 50 calculates a weight so that a value of the constraint becomes smaller in the texture area. When using the weight, the regularization term calculation unit 30 calculates a regularization constraint (cost) in which a difference between pixels in the texture area is evaluated as lower than a difference between pixels in other areas. Namely, the regularization term calculation unit 30 calculates a regularization constraint by using a weight that makes the regularization constraint less likely to be affected by a difference between pixels in the texture area. As a result, the image processing device 10 according to the present exemplary embodiment can restore an image in which a decline (grading into a low tone) of a difference between pixels in the texture area (for example, a tone degree) is suppressed.

When the regularization term calculation unit 30 uses a value (regularization constraint) that becomes larger when the constraint is smaller, the weight calculation unit 50 may calculate a weight so that a value of the constraint becomes larger in the texture area. Alternatively, the weight calculation unit 50 may calculate the weight in the same manner, and the regularization term calculation unit 30 may change the calculation method by using the weight (for example, multiplying and adding upon inverting the sign).

Subsequently, the weight calculation unit 50 according to the present exemplary embodiment will be further described with reference to drawings.

The weight calculation unit 50 determines a texture area based on a feature value of a pixel in the texture area.

The feature value of the pixel in the texture area is not particularly limited. For example, the feature value of the pixel is considered to be a tone of luminance and luminous intensity, a difference in color (hue), and a difference in chroma. In the following description, luminance will be used as an example of the feature value.

An area of an image will be described with reference to drawings.

Figure 2:
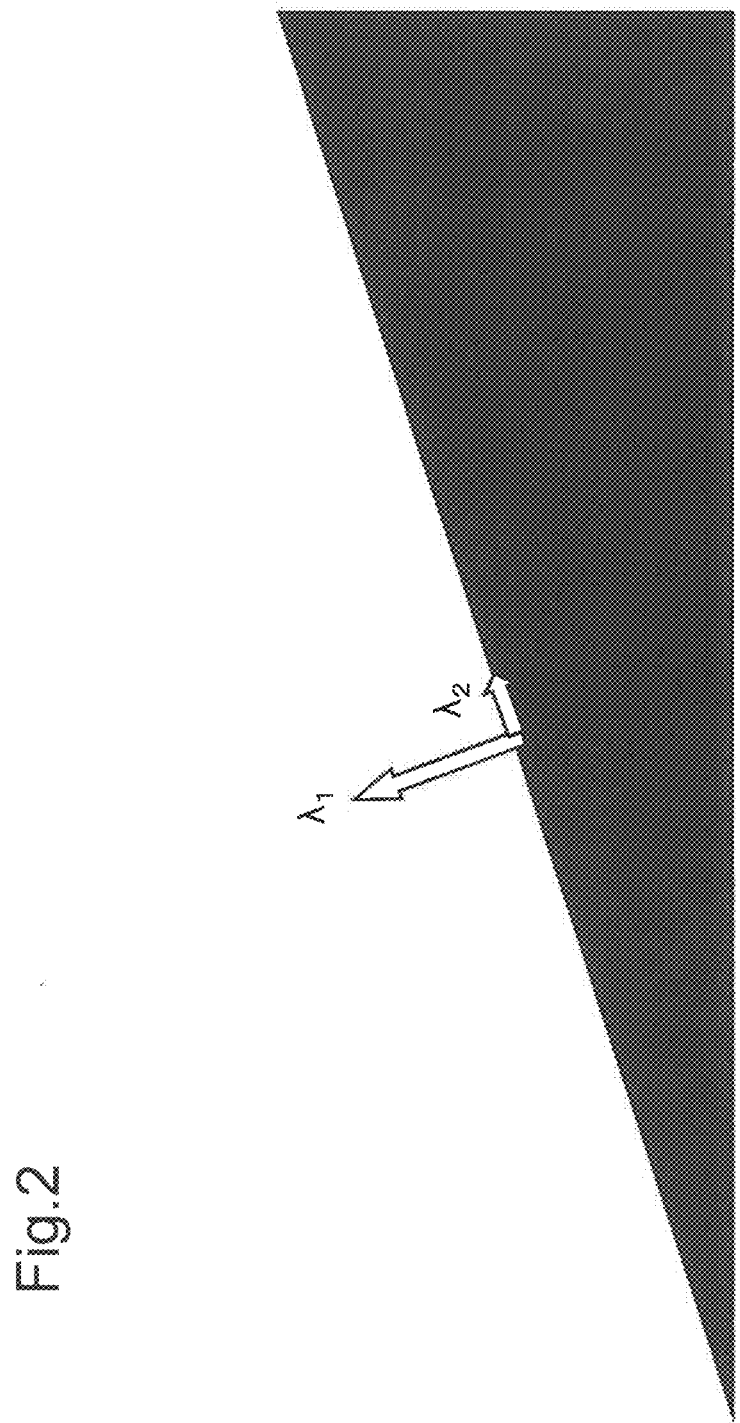
FIG. 2 is a diagram for illustrating an edge area.

FIG. 2 is a diagram for illustrating an edge area including an edge.

As illustrated in FIG. 2, in the edge area, a border (for example, a border of white and black) is clear, and the border is substantially in a single direction. Namely, in the edge area, a gradient amount of the luminance is large, and a luminance gradient direction is substantially equal. Arrows of $\lambda_1$ and $\lambda_2$ illustrated in FIG. 2 are main components of the luminance gradient (however, $\lambda_1 \geq \lambda_2$). Namely, in the edge area, since the luminance gradient amount is large, the luminance gradients become "$\lambda_1 > \lambda_2$". In the edge area, the luminance gradient directions are equal.

Figure 3:
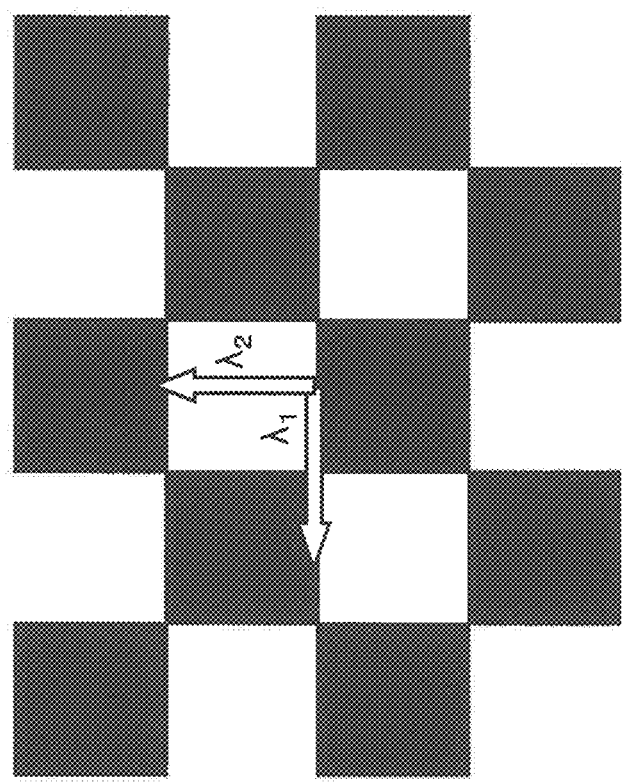
FIG. 3 is a diagram for illustrating a texture area.

FIG. 3 is a diagram for illustrating a texture area. ($\lambda$ in FIG. 3 is the same as $\lambda$ in FIG. 2.)

As illustrated in FIG. 3, in the texture area, the luminance gradient amount is large, but the directions of the luminance gradient are not equal (for example, in FIG. 3, there are borders in the horizontal direction and borders in the vertical direction.) Namely, in the texture area, the luminance gradient amount is large. In the texture area, the luminance gradient directions are not equal ($\lambda_1 \approx \lambda_2$).

Specific examples of the texture area are an area of a forest with trees, an area of a carpet indoors, an area of hair on the head, and the like. However, the texture area is not limited thereto. The texture area may be any area as long as the area has such a feature that feature values (for example, a tone of luminance) of predetermined pixels are greatly different between adjacent pixels or between pixels in the vicinity in the image. The texture area according to the present exemplary embodiment includes various areas including the above.

On the other hand, a flat area has a small luminance gradient amount. In the flat area, the luminance gradient directions may be equal or not equal. In the flat area, there is a case that no difference exists in the components of the luminance gradient and it is impossible to derive the luminance gradient direction.

The weight calculation unit 50 according to the present exemplary embodiment detects a texture area based on the above feature of each area, and calculates a weight of the detected texture area.

Figure 4:
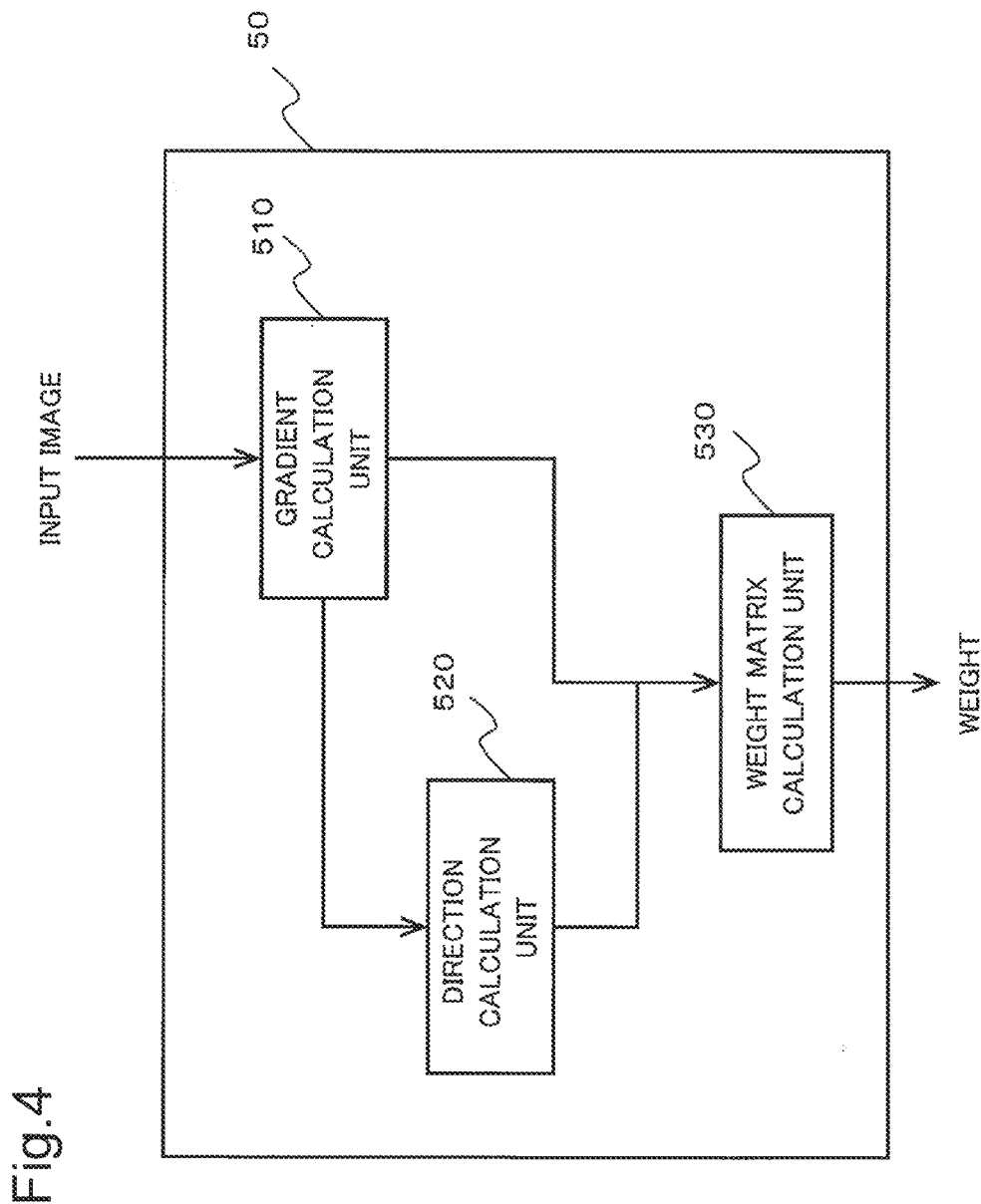
FIG. 4 is a block diagram illustrating an example of a configuration of a weight calculation unit according to the first exemplary embodiment.

FIG. 4 is a block diagram illustrating an example of a configuration of the weight calculation unit 50 according to the present exemplary embodiment.

The weight calculation unit 50 includes a gradient calculation unit 510, a direction calculation unit 520, and a weight data calculation unit 530.

The gradient calculation unit 510 calculates a luminance gradient amount. The weight calculation unit 50 determines a flat area and other areas (the edge area and the texture area) based on the luminance gradient amount.

The gradient calculation unit 510 according to the present exemplary embodiment is not particularly limited in terms of a method of calculating a luminance gradient amount, and can use various methods.

For example, the gradient calculation unit 510 may calculate the luminance gradient amount as follows.

First, the gradient calculation unit 510 calculates horizontal and vertical components ($1_x$, $1_y$) of the luminance gradient amount of the entire image. Then, the gradient calculation unit 510 calculates components of the luminance gradient amount by using, for example, Sobel Filter.

Subsequently, the gradient calculation unit 510 calculates a matrix (matrix I) in which a sum of squares of the components ($1_x$, $1_y$) of the luminance gradient amount is a diagonal component.

In the flat area, the luminance gradient amount is small, and in the other areas (the edge area and the texture area), the luminance gradient amount is large.

For this reason, the weight data calculation unit 530 to be described later can determine the flat area and the other areas (the edge area and the texture area) by comparing the sum of squares (the diagonal component of the matrix I) with a predetermined threshold value.

The gradient calculation unit 510 may store, as a determination result, the sum of squares.

Alternatively, the gradient calculation unit 510 is not limited to the above, and may store a calculation result as stored information suitable for post processing. For example, the gradient calculation unit 510 may store, as a mask indicating the flat area, the determination result. More specifically, the gradient calculation unit 510 may generate and store a mask (mask matrix M) in which a value "1" is set in the flat area, and a value "0" is set in the other areas.

The direction calculation unit 520 calculates a luminance gradient direction amount. Then, the direction calculation unit 520 determines the texture area and the edge area based on the luminance gradient direction amount.

In the edge area, the luminance gradient directions are equal.

On the other hand, in the texture area, the luminance gradient directions are not equal.

Therefore, the direction calculation unit 520 operates, for example, as follows.

First, the direction calculation unit 520 calculates, as a straight line pixel (edge), a pixel in which a coordinate (x, y) satisfies the following numerical expression 3.

$$(I_x(x,y)^2 + I_y(x,y)^2 > t_1) \char`\^ (\lambda_1/\lambda_2 > t_2)$$ [Expression 3]

In the above, x and y are coordinates of the pixel in the horizontal direction and in the vertical direction, respectively. Each variable is as follows.

$I_x$ and $I_y$: luminance gradient components in the horizontal and vertical directions $t_1$ and $t_2$: predetermined threshold values $\lambda_1$ and $\lambda_2$: eigenvalues of a matrix A indicated in the following numerical expression 4, however, $\lambda_1 > \lambda_2$ $$A = \sum_{x,y \in R} \begin{pmatrix} I_x(x,y)^2 & I_x(x,y)I_y(x,y) \\ I_x(x,y)I_y(x,y) & I_y(x,y)^2 \end{pmatrix}$$ [Expression 4]

In the above, R is an area including the pixel and pixels in the vicinity. (In this case, the vicinity means a range defined in advance, for example, a range of three pixels forward, backward, and sideways.)

Further, the direction calculation unit 520 calculates a matrix J as a degree of equality in the luminance gradient directions by using a eigenvalue of the matrix A of a pixel satisfying the numerical expression 3.

In the above, the matrix J is a diagonal matrix. Then, a diagonal component of the matrix J is a value calculated by using the eigenvalue of the matrix A of each pixel satisfying the numerical expression 3. A diagonal component $J_i$ corresponding to the i-th pixel is expressed in the following numerical expression 5, where the eigenvalues of the pixel (pixel i) are denoted as $\lambda_{i1}$ and $\lambda_{i2}$.

$$J_i = J_0 \xi_a((\lambda_{i1}/\lambda_{i2}) - \lambda_0) \qquad \text{[Expression 5]}$$

In the above, $J_0$ denotes a parameter defined in advance with regard to occurrence of a step-like shape (jaggy) generated in a super resolution image. The jaggy generated in the super resolution image is less likely to be generated when a value of $J_0$ is larger. It is noted that the image processing device 10 may store $J_0$ in advance, and is not particularly limited in terms of a method of obtaining $J_0$. For example, the image processing device 10 may read $J_0$ from a database storing a parameter, not depicted, and may receive an input of $J_0$ from a user. It is noted that $\lambda_0$ is a predetermined constant.

A function $\xi_a$ is a sigmoid function indicated by the following numerical expression 6.

$$\xi_a = 1/(1 + \exp(-ax)) \qquad \text{[Expression 6]}$$

In the texture area, the luminance gradient directions are not equal. Therefore, the weight data calculation unit 530 to be described later can determine the texture area and the edge area based on the matrix J calculated by the direction calculation unit 520.

The weight data calculation unit 530 calculates a weight used by the regularization term calculation unit 30, based on the calculation result of the gradient calculation unit 510 (luminance gradient amount) and the calculation result of the direction calculation unit 520 (degree of equality in the luminance gradient directions (matrix J)). As a more specific description, the weight data calculation unit 530 determines an area including the edge area and the texture area based on the calculation result of the gradient calculation unit 510 (luminance gradient amount). Then, the weight data calculation unit 530 determines the texture area from the determined area by using the result of the direction calculation unit 520. Then, the weight data calculation unit 530 calculates a weight by decreasing a weight of the determined texture area.

The weight data calculation unit 530 transmits the calculated weight to the regularization term calculation unit 30.

The weight data calculation unit 530 may not particularly limit a format of the weight data as long as the weight is usable by the regularization term calculation unit 30. The weight data calculation unit 530 may transmit the weight as vector data, or may transmit the weight as matrix data. In the following description, as an example, the weight data calculation unit 530 calculates the weight as expressed in the following numerical expression 7 by using the calculation results of the gradient calculation unit 510 and the direction calculation unit 520.

$$\text{diag}(\Lambda) = \alpha \cdot (I - \text{diag}(M)) + \beta \cdot \text{diag}(M) \cdot \text{diag}(J) \qquad \text{[Expression 7]}$$

In the above, $\Lambda$ denotes a vector, and diag ($\Lambda$) is a diagonal matrix in which a component of the vector $\Lambda$ is arranged in the diagonal component (hereinafter referred to as "weight" or "weight matrix"). $\alpha$ and $\beta$ are predetermined constants. The matrix I and the matrix M are a unit matrix and a mask matrix calculated from a matrix of the sum of squares calculated by the gradient calculation unit 510. The matrix J is the calculation result indicating a degree of equality in the luminance gradient calculated by the direction calculation unit 520.

The weight data calculation unit 530 transmits the calculated weight to the regularization term calculation unit 30.

The regularization term calculation unit 30 receiving the weight calculates a constraint of the regularization term by using the weight.

Specifically, for example, the regularization term calculation unit 30 uses a constraint R (X) of the regularization term as expressed in the following numerical expression 8.

$$R(X) = \sum_{l,m=-P}^{P} \| \text{diag}(\Lambda) \cdot (X - S_x^l S_y^m X) \|_1^1 \qquad \text{[Expression 8]}$$

In the above, the matrix X is an input image. The matrix S is a matrix indicating parallel movement. A subscript of S denotes a direction, and a superscript of S denotes the number of pixels to move. For example, $S_x^1$ is a matrix moving in parallel in the x direction by 1 pixels. It is noted that the constraint R (X) of the regularization term calculation unit 30 is not limited to the numerical expression 8. For example, the regularization term calculation unit 30 may use a constraint R (X) as denoted in the following numerical expression 9 instead of the numerical expression 8.

$$R(X) = \sum_{l,m=-P}^{P} \| \text{diag}(\Lambda) \cdot (X - S_x^l S_y^m X) \|_p^q \qquad \text{[Expression 9]}$$

In the above, p and q are parameters determined by a user.

In the above description, each component of the image processing device 10 transmits data to a subsequent component. However, the image processing device 10 is not necessarily limited to this configuration. For example, the image processing device 10 may include a storage unit, not depicted, and each component may store a result to the storage unit, and may retrieve required data from the storage unit.

In the description about the present exemplary embodiment above, $\alpha$ and $\beta$ are predetermined constants, and p and q are predetermined parameters. However, the present exemplary embodiment is not limited thereto. For example, the image processing device 10 may determine $\alpha$, $\beta$, p, and q based on a predetermined method (for example, regression analysis) in advance for each pixel or each area.

As a more specific example, for example, the image processing device 10 may derive $\alpha$, $\beta$, p, and q based on a learning high resolution image (hereinafter referred to as "$X_H$") prepared in advance and a low resolution image (hereinafter referred to as "$Y_L$") artificially generated from the high resolution image ($X_H$).

For example, this will be described as follows in a more specific manner.

The image processing device 10 derives a set of $\alpha$, $\beta$, p, and q so as to minimize the function R ($X_H$) expressed in the numerical expression 9 for each pixel or for each area of a plurality of learning high resolution images ($X_H$). Then, the image processing device 10 may derive a function for calculating $\alpha$, $\beta$, p, and q from a value of the low resolution image ($Y_L$) generated from the high resolution image ($X_H$)

for each pixel or for each area by using a predetermined method (for example, regression analysis).

In this case, as a function, the image processing device 10 calculates functions of $\alpha$, $\beta$, p, and q having $J_L$ as an argument, based on various $J_L$ calculated by applying the numerical expression 5 to the low resolution image ($Y_L$) and $\alpha$, $\beta$, p, and q corresponding to $J_L$, for example. (The respective functions will be hereinafter referred to as $\alpha_L (J_L)$, $\beta_L (J_L)$, $p_L (J_L)$, and $q_L (J_L)$) Alternatively, more directly, the image processing device 10 may hold various $J_L$ and $\alpha$, $\beta$, p, and q corresponding thereto on a lookup table, and may derive values of $\alpha$, $\beta$, p, and q by referring to the lookup table.

Then, the image processing device 10 calculates $J_L$ even for the low resolution input image ($Y_L$), which is to be made into the super resolution image, by using the numerical expression 5. Then, the image processing device 10 may calculate $\alpha$, $\beta$, p, and q by using the above functions ($\alpha_L (J_L)$, $\beta_L (J_L)$, $p_L (J_L)$, and $q_L (J_L)$) or the lookup table based on the calculated $J_L$.

However, the calculation method of $\alpha$, $\beta$, p, and q performed by the image processing device 10 is not limited thereto.

For example, the image processing device 10 may use the following method.

The image processing device 10 calculates $J_H$ calculated by applying the numerical expression 5 to the high resolution image ($X_H$) and a set of $\alpha$, $\beta$, p, and q that minimizes the function R ($X_H$) expressed in the numerical expression 9 for each pixel or for each area in advance. Then, like the method described above, the image processing device 10 calculates relationship of $J_H$, and $\alpha$, $\beta$, p, and q based on a predetermined method (for example, regression analysis). (Hereinafter, functions of them ($J_H$ and $\alpha$, $\beta$, p, and q) will be hereinafter referred to as $\alpha_H (J_H)$, $\beta_H (J_H)$, $p_H (J_H)$, and $q_H (J_H)$.) Alternatively, the image processing device 10 holds $\alpha$, $\beta$, p, and q as the lookup table.

Then, the image processing device 10 calculates $J_L$ by applying the numerical expression 5 to the input low resolution image ($Y_L$). Thereafter, the image processing device 10 provisionally calculates $\alpha$, $\beta$, p, and q by using the above functions ($\alpha_L (J_L)$, $\beta_L (J_L)$, $p_L (J_L)$, and $q_L (J_L)$) or the lookup table. Then, the image processing device 10 generates a super resolution image (hereinafter referred to as "$X_{SR}$") by using them ($\alpha$, $\beta$, p, and q).

Further, the image processing device 10 calculates $J_{SR}$ by applying the numerical expression 5 to the super resolution image ($X_{SR}$).

Then, the image processing device 10 calculates $\alpha$, $\beta$, p, and q again based on $J_{SR}$ and the above functions ($\alpha_H (J_H)$, $\beta_H (J_H)$, $p_H (J_H)$, and $q_H (J_H)$). Then, the image processing device 10 updates the super resolution image ($X_{SR}$) by using the calculated $\alpha$, $\beta$, p, and q.

The image processing device 10 repeats the above processing until there is no change in the super resolution image ($X_{SR}$) and values of $\alpha$, $\beta$, p, and q, or the change fits within a predetermined range. As described above, the image processing device 10 updates the super resolution image ($X_{SR}$).

Alternatively, the image processing device 10 may calculate $\alpha$, $\beta$, p, and q as follows.

In the above description, the image processing device 10 calculates $\alpha$, $\beta$, p, and q by using $J_L$ calculated by applying the numerical expression 5 to the input low resolution image ($Y_L$) or $J_{SR}$ calculated by applying the numerical expression 5 to the super resolution image ($X_{SR}$). However, the image processing device 10 may calculate $\alpha$, $\beta$, p, and q by using both of $J_L$ and $J_{SR}$.

Namely, the image processing device 10 calculates $J_H$ calculated by applying the numerical expression 5 to the high resolution image ($X_H$) and $J_L$ calculated by applying the numerical expression 5 to the low resolution image ($Y_L$) generated from the high resolution image ($X_H$) for each pixel or for each area in advance. Further, the image processing device 10 calculates $\alpha$, $\beta$, p, and q that minimizes the function R ($X_H$) expressed in the numerical expression 9.

Then, the image processing device 10 calculates functions having $J_L$ and $J_H$ as arguments by using $J_L$ and $J_H$, and $\alpha$, $\beta$, p, and q corresponding thereto for a predetermined method (for example, regression analysis). (The functions will be hereinafter referred to as $\alpha_{LH} (J_L, J_H)$, $\beta_{LH} (J_L, J_H)$, $p_{LH} (J_L, J_H)$, and $q_{LH} (J_L, J_H)$.) Alternatively, the image processing device 10 holds relationship of "$\alpha$, $\beta$, p and q" and "$J_L$ and $J_H$" as a lookup table.

Then, the image processing device 10 derives $J_L$ and $J_{SR}$ based on the super resolution image ($X_{SR}$) generated by using the same method as the above, and the input image ($Y_L$). Then, the image processing device 10 calculates $\alpha$, $\beta$, p, and q based on $J_L$ and $J_{SR}$. Then, the image processing device 10 updates the super resolution image ($X_{SR}$) based on the calculated $\alpha$, $\beta$, p, and q. Then, the image processing device 10 calculates $J_L$ and $J_{SR}$ based on the updated super resolution image ($X_{SR}$) and the input image ($Y_L$). Then, the image processing device 10 updates $\alpha$, $\beta$, p and q by using $\alpha_{LH} (J_L, J_H)$, $\beta_{LH} (J_L, J_H)$ $p_{LH} (J_L, J_H)$, and $q_{LH} (J_L, J_H)$ based on the calculated $J_L$ and $J_{SR}$. The image processing device 10 repeats the above processing until there is no change in the super resolution image ($X_{SR}$), and values of $\alpha$, $\beta$, p, and q, or the change fits within a predetermined range.

As described above, the image processing device 10 according to the present exemplary embodiment can achieve the effect of reducing decrease of the tone in the texture area where the tone is to be left in restoration of the high resolution image.

The reason for this is as follows.

The weight calculation unit 50 of the image processing device 10 determines the texture area based on magnitude of the luminance gradient amount and a degree of equality in the luminance gradient amounts. Then, for the determined texture area, the weight calculation unit 50 calculates a weight so that a difference between pixels is large and a calculation result of the regularization term (regularization constraint) becomes lower. Then, the regularization term calculation unit 30 calculates a regularization term by using the weight. This is because the image restoring unit 40 can select (restore) a restored image in which the tone of the texture area is not reduced.

[Modification]

The configuration of the image processing device 10 is not limited to the above description.

For example, the image processing device 10 may include a storage unit described above, not depicted.

In the image processing device 10, each component may be divided into a plurality of components.

For example, in the weight calculation unit 50, the direction calculation unit 520 may be divided into a matrix A calculation unit, an eigenvalue calculation unit, and a matrix J calculation unit.

Alternatively, in the image processing device 10, a plurality of components may be combined into a single component. For example, the weight calculation unit 50 and the regularization term calculation unit 30 may be combined into a single component.

Furthermore, the image processing device 10 according to the present exemplary embodiment may be realized as a computer including a CPU (Central Processing Unit), a ROM (Read Only Memory), and a RAM (Random Access Memory). Further, the image processing device 10 may include an IO (Input/Output unit) and an NIC (Network Interface Circuit or Network interface Card), and may be connected to other devices or equipment.

Figure 5:
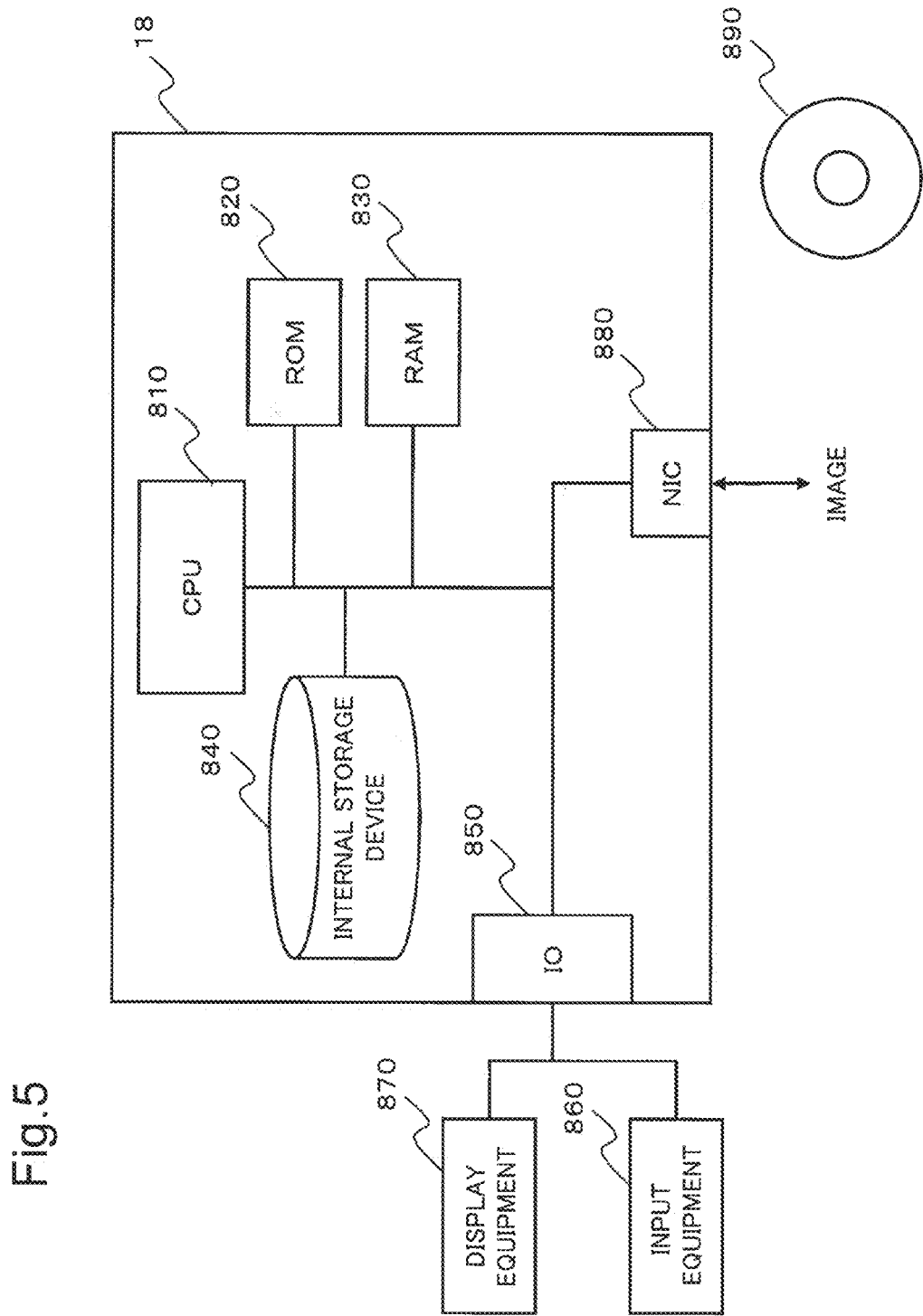
FIG. 5 is a block diagram illustrating another example of a configuration of an image processing device according to the first exemplary embodiment.

FIG. 5 is a block diagram illustrating an example of a configuration of an image processing device 18 as another configuration of the present exemplary embodiment.

The image processing device 18 includes a CPU 810, a ROM 820, a RAM 830, an internal storage device 840, an IO 850, input equipment 860, display equipment 870, and an NIC 880, and constitutes a computer.

The CPU 810 reads a program from the ROM 820 or the internal storage device 840. Then, the CPU 810 realizes each function as the reconstruction constraint calculation unit 20, the regularization term calculation unit 30, the image restoring unit 40, and the weight calculation unit 50 of the image processing device 10 illustrated in FIG. 1 based on the read program. When each function is realized, the CPU 810 uses the RAM 830 or the internal storage device 840 as a temporary storage. The CPU 810 receives input data from the input equipment 860 and outputs data to the display equipment 870, via the IO 850.

The CPU 810 may read a program included in a storage medium 890 storing a computer-readable program into the RAM 830 by using a storage medium reading device not depicted, and may operate. As described above, the CPU 810 may use a non-transitory memory such as the ROM 810 and the storage medium 890, or may use a transitory memory such as the RAM 830.

Alternatively, the CPU 810 may receive a program from an external device, not depicted, via an NIC 880.

The ROM 820 stores the program executed by the CPU 810 and fixed data. The ROM 820 is, for example, a P-ROM (Programmable-ROM) or a flash ROM.

The RAM 830 temporarily stores the program executed by the CPU 810 and data. The RAM 830 is, for example, a D-RAM (Dynamic-RAM).

The internal storage device 840 stores data and a program to be stored by the image processing device 18 for a long time. The internal storage device 840 may operate as a temporary storage device of the CPU 810. The internal storage device 840 is, for example, a hard disk device, a magneto-optical disk device, an SSD (Solid State Drive), or a disk array device.

The IO 850 relays data between the CPU 810, and the input equipment 860 and the display equipment 870. The IO 850 is, for example, an IO interface card or a USB (Universal Serial Bus) card.

The input equipment 860 is an input unit for receiving an input command from an operator of the image processing device 18. The input equipment 860 is, for example, a keyboard, a mouse, or a touch panel.

The display equipment 870 is a display unit of the image processing device 18. The display equipment 870 is, for example, a liquid crystal display.

The NIC 880 relays exchange of data (image) with other devices (for example, a device for transmitting an input image and a device for receiving a restored image, not depicted) via a network. The NIC 880 is, for example, a LAN (Local Area Network) card.

The image processing device 18 configured as described above can achieve the same effects as the image processing device 10.

This is because the CPU 810 of the image processing device 18 can realize the same operation as the image processing device 10 based on the program.

(Second Exemplary Embodiment)

In many cases, an edge included in an edge area is smooth. However, there is a case in that the edge is step-like (jaggy). For determination as to whether the edge is smooth or jaggy, it is necessary to refer to a plurality of pixels. However, in the TV and BTV, since a difference between individual pixels is used, it is impossible to determine whether the edge is smooth or jaggy. For this reason, in the technique described in PLT 1, there is a problem that jaggy noise is generated in an edge area including a smooth edge.

An image processing device 11 according to a second exemplary embodiment suppresses occurrence of jaggy noise in the edge area.

Figure 6:
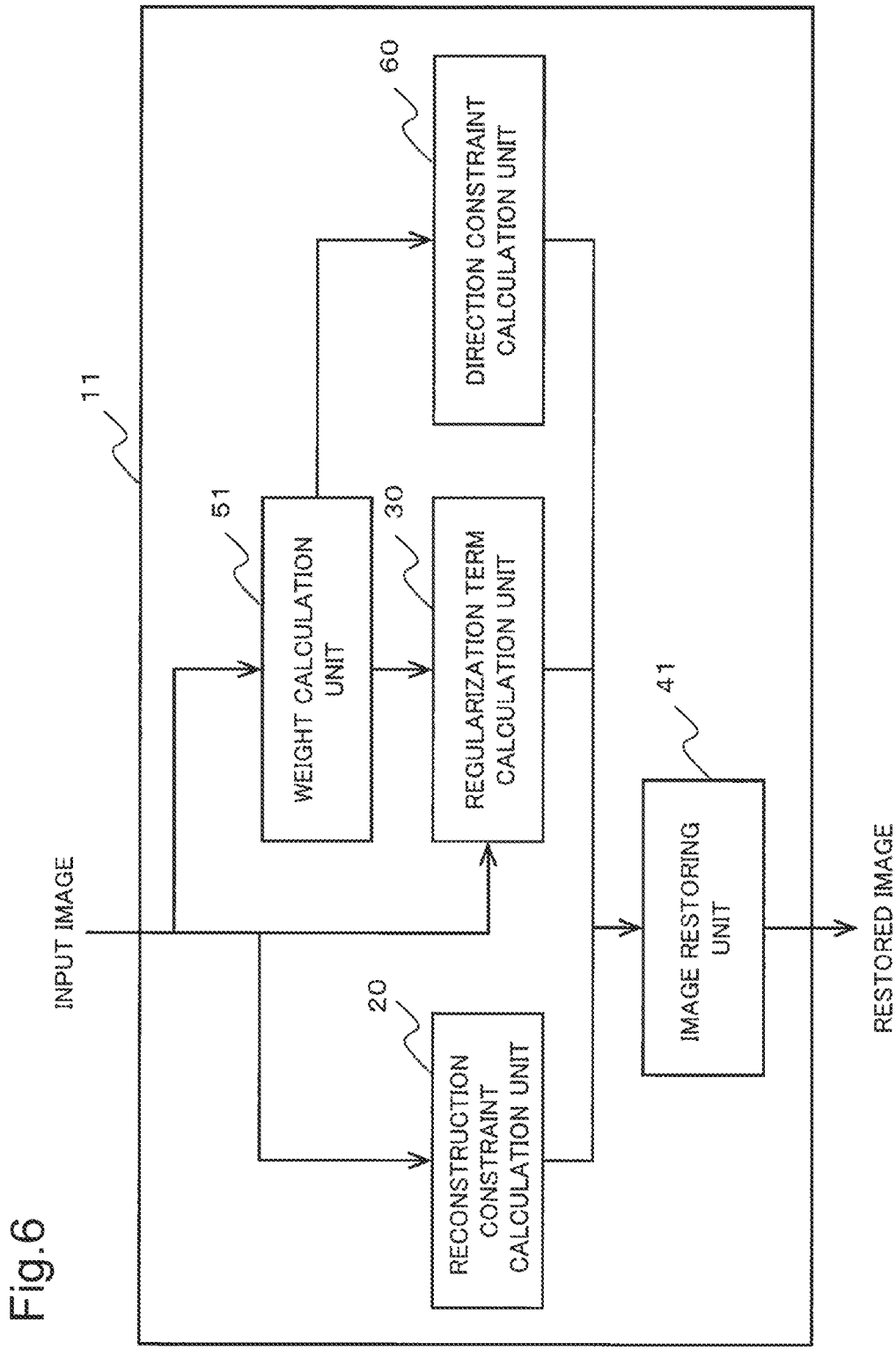
FIG. 6 is a block diagram illustrating an example of a configuration of an image processing device according to a second exemplary embodiment.

FIG. 6 is a block diagram illustrating an example of a configuration of the image processing device 11 according to the second exemplary embodiment.

The image processing device 11 includes the reconstruction constraint calculation unit 20, the regularization term calculation unit 30, an image restoring unit 41, a weight calculation unit 51, and a direction constraint calculation unit 60.

Like the image processing device 10, the image processing device 11 according to the present exemplary embodiment may be realized as a computer including the CPU 810, the ROM 820, and the RAM 830 illustrated in FIG. 5.

The reconstruction constraint calculation unit 20 and the regularization term calculation unit 30 are the same as those in the image processing device 10 according to the first exemplary embodiment, and therefore, detailed description thereabout is omitted.

The weight calculation unit 51 operates in the same manner as the weight calculation unit 50 according to the first exemplary embodiment except that the calculated weight is transmitted to not only the regularization term calculation unit 30 but also the direction constraint calculation unit 60. Therefore, detailed description thereabout other than the above is omitted.

The direction constraint calculation unit 60 calculates a constraint (direction constraint) having a pixel value to be smooth in the edge direction for an area where directions (edge directions) perpendicular to the maximum luminance gradient direction are equal, such as an edge included in the edge area.

For example, the direction constraint calculation unit 60 may use a differential value in the edge direction as a value indicating smoothness to be used to calculate the direction constraint.

When using the differential value in the edge direction, the direction constraint calculation unit 60 may calculate the direction constraint as follows.

The direction constraint calculation unit 60 imposes small penalty to an area where a change of the differential value is small (decreases the direction constraint) as an area where the edge direction is smooth. On the other hand, the direction constraint calculation unit 60 imposes large penalty to an area where a change of the differential value is large (increases the direction constraint) as an area where the edge direction is not smooth.

As description using a numerical expression, for example, the direction constraint calculation unit 60 may calculate the direction constraint expressed in the following numerical expression 10.

$$E_{Jag}(X) = \frac{1}{2}(L_n X) \cdot \text{diag}(J) \cdot L_n X \qquad \text{[Expression 10]}$$

In the above, the matrix $L_n$ is a differential along the edge direction indicated in the following numerical expression (numerical expression 11).

$$L_n = -L_x \cdot \sin\theta + L_y \cdot \cos\theta \qquad \text{[Expression 11]}$$

In the above, $\theta$ denotes an angle between the horizontal direction (x axis) and the edge direction.

The image restoring unit 41 restores an image in view of not only the reconstruction constraint and the regularization constraint but also the direction constraint calculated by the direction constraint calculation unit 60.

Specifically, the image restoring unit 41 selects (restores) an image minimizing the following numerical expression 12.

$$\|DBX-Y\|_2^2 + R(X) + E_{Jag}(X) \qquad \text{[Expression 12]}$$

The third term of the numerical expression 12 is a direction constraint. The first term and the second term are the same as the numerical expression 2.

As described above, the image processing device 11 according to the second exemplary embodiment can achieve the effect of suppressing occurrence of jaggy noise in the edge area.

The reason for this is as follows.

The direction constraint calculation unit 60 of the image processing device 11 calculates a direction constraint for giving larger penalty to an area being not smooth in the edge direction than penalty given to a smooth area. Because the image restoring unit 41 restores an image in view of the direction constraint, the image restoring unit 41 can restore the image in which the area where the edge direction is smooth is left.

(Third Exemplary Embodiment)

In TV and BTV, it is necessary to calculate differences between all pixels in a target range. In particular, in BTV, it is necessary to calculate differences between all pixels in the vicinity area. For this reason, the technique described in PLT 1 requires a long processing time.

An image processing device 12 according to a third exemplary embodiment can reduce the processing time.

Figure 7:
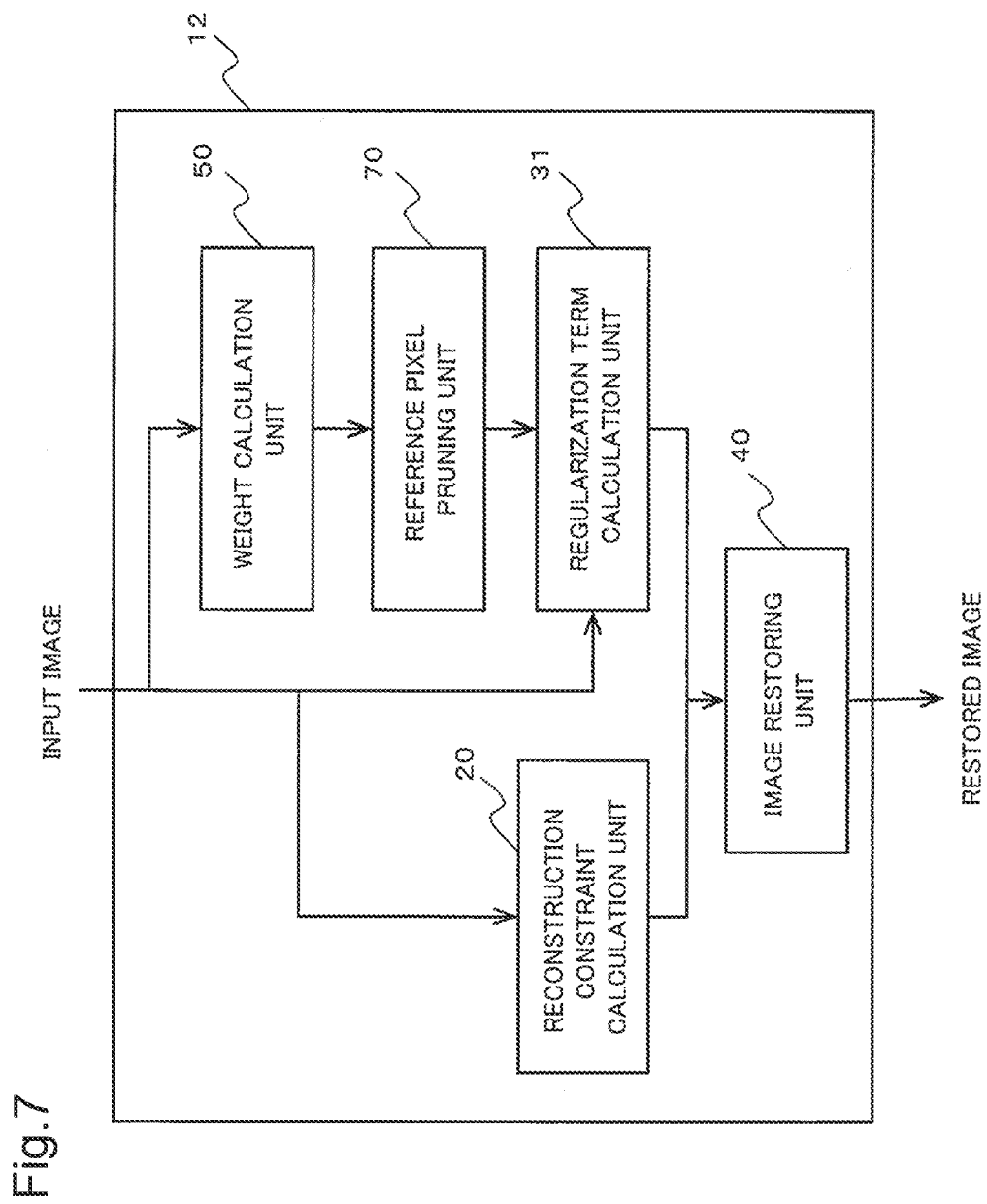
FIG. 7 is a block diagram illustrating an example of a configuration of an image processing device according to a third exemplary embodiment.
Figure 8:
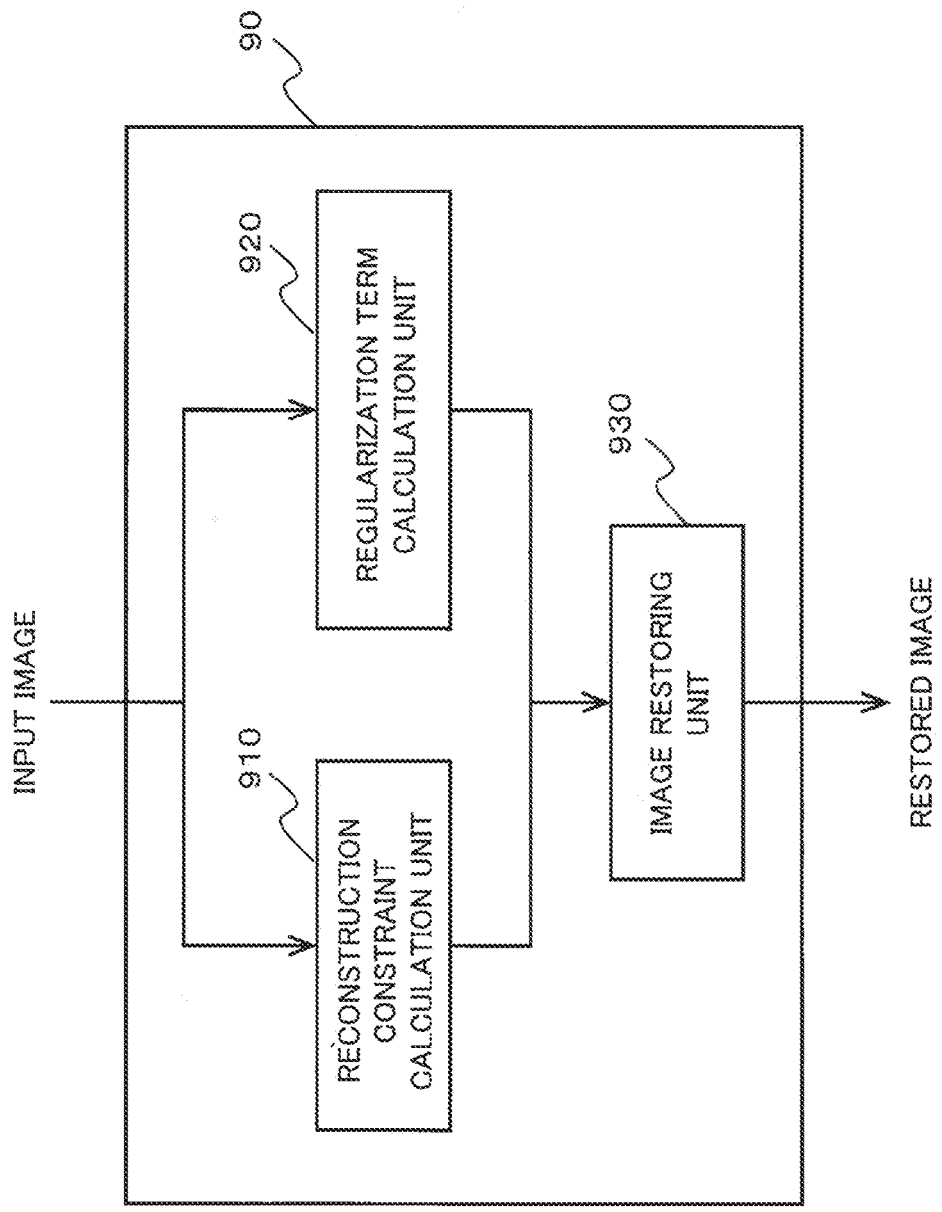
FIG. 8 is a block diagram illustrating an example of a configuration of a general image processing device.

FIG. 7 is a block diagram illustrating an example of a configuration of the image processing device 12 according to the third exemplary embodiment.

The image processing device 12 includes the reconstruction constraint calculation unit 20, a regularization term calculation unit 31, the image restoring unit 40, the weight calculation unit 50, and a reference pixel pruning unit 70.

The image processing device 12 according to the third exemplary embodiment may include the direction constraint calculation unit 60 according to the second exemplary embodiment.

Further, like the image processing device 10, the image processing device 12 according to the present exemplary embodiment may be realized as a computer including the CPU 810, the ROM 820, and the RAM 830 illustrated in FIG. 5.

The reconstruction constraint calculation unit 20, image restoring unit 40, and the weight calculation unit 50 are the same as those of the image processing device 10 according to the first exemplary embodiment, and therefore, detailed description thereabout is omitted.

The reference pixel pruning unit 70 performs processing so as not to use a part of the weights calculated by the weight calculation unit 50, for calculation of the regularization constraint in the regularization term calculation unit 31. This processing will be hereinafter referred to as "pruning".

The regularization term calculation unit 31 calculates a regularization term by using the weight pruned by the reference pixel pruning unit 70. Therefore, the regularization term calculation unit 31 can reduce the number of pixels used for calculation of the regularization term.

The pruning processing of the reference pixel pruning unit 70 according to the present exemplary embodiment is not particularly limited.

For example, the reference pixel pruning unit 70 may include a mask corresponding to a pixel determined in advance, and apply the mask to the weight. In this case, the regularization term calculation unit 31 does not calculate a regularization constraint for a pixel corresponding to the masked weight.

The reference pixel pruning unit 70 may randomly select a component of the weight, and set the value of the component to "0". For example, when the weight calculation unit 50 calculates the weight indicated in the numerical expression 7, the reference pixel pruning unit 70 randomly selects a part of the components of the vector A or the weight matrix (diag ($\Lambda$)), and set the value thereof to "0".

Then, when the reference pixel pruning unit 70 sets the component to "0" as described above, the regularization term calculation unit 31 does not calculate a difference of the component of which value is "0".

As described above, the regularization term calculation unit 31 reduces the calculation processing of the difference based on the result of the reference pixel pruning unit 70.

The reference pixel pruning unit 70 may not operate the weight, and may notify the regularization term calculation unit 31 of information about pruning (for example, a flag) as information different from the weight. In this case, like the first exemplary embodiment, the regularization term calculation unit 31 may receive the weight from the weight calculation unit 50, and may reduce pixels for which the regularization constraint is calculated, based on the pruning information from the reference pixel pruning unit 70.

As described above, the image processing device 12 according to the third exemplary embodiment can achieve the effect of reducing the processing time.

The reason for this is as follows.

The reference pixel pruning unit 70 of the image processing device 12 sets reduction of pixels for which the difference is not calculated in the regularization term calculation unit 30. The reason is that, as a result, the regularization term calculation unit 31 can reduce processing of calculation of the difference.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2012-260844, filed on Nov. 29, 2012, the disclosure of which is incorporated herein in its entirety by reference.

The whole or part of the exemplary embodiments disclosed above can be described as, but not limited to, the following supplementary notes.

(Supplementary note 1) An image processing device includes: a weight calculation unit that determines an area where a feature value of an input image is saved, based on a gradient of a feature value of a pixel of the input image and a direction of the gradient, and calculates a weight for reducing a regularization constraint that is a constraint based on regularization of image processing in the area where the feature value is saved; a regularization term calculation unit that calculates a regularization constraint of a high resolution image restored based on the input image by using the weight; a reconstruction constraint calculation unit that calculates a reconstruction constraint that is a constraint based on reconstruction of the high resolution image; and an image restoring unit that restores the high resolution image from the input image based on the regularization constraint and the reconstruction constraint.

(Supplementary note 2) The image processing device according to supplementary note 1, wherein the weight calculation unit comprising: a gradient calculation unit that calculates a gradient of a feature value of a pixel of the input image; a direction calculation unit that calculates a degree of equality in directions of gradient of the feature values; and a weight data calculation unit that calculates the weight based on the gradient and a degree of equality in the directions.

(Supplementary note 3) The image processing device according to supplementary note 1 or 2, wherein the weight data calculation unit, in an area where magnitude of the gradient is more than a predetermined value, and a degree of equality in directions of the gradient is less than a predetermined value, calculates a weight reduced by a predetermined value.

(Supplementary note 4) The image processing device according to any one of supplementary notes 1 to 3, wherein the regularization term calculation unit calculates a necessary constant for representing the regularization term from a high resolution image for learning, a low resolution image artificially generated from the high resolution image, and a calculated weight by the weight calculation unit.

(Supplementary note 5) The image processing device according to any one of supplementary notes 1 to 4, wherein the regularization term calculation unit calculates the necessary constant for representing the regularization term from a high resolution image for learning, a low resolution image artificially generated from the high resolution image, a super resolution image generated provisionally, and a calculated weight by the weight calculation unit.

(Supplementary note 6) The image processing device according to any one of supplementary notes 1 to 5, includes: a direction constraint calculation unit that calculates a direction constraint with which an edge direction perpendicular to a gradient direction of a feature value of the input image is smooth in the restored image, wherein the image restoring unit restores an image by using the direction constraint in addition to the reconstruction constraint and the regularization constraint.

(Supplementary note 7) The image processing device according to any one of supplementary notes 1 to 6, further includes: a reference pixel pruning unit that imposes a limitation so that some of pixels are not used in calculation of the regularization constraint by the regularization term calculation unit.

(Supplementary note 8) The image processing device according to supplementary note 7, wherein the reference pixel pruning unit deletes a part of weights calculated by the weight calculation unit.

(Supplementary note 9) An image processing method includes: determining an area where a feature value of an input image is saved, based on a gradient of a feature value of a pixel of the input image and a direction of the gradient, and calculating a weight for reducing a regularization constraint that is a constraint based on regularization of image processing in the area where the feature value is saved; calculating a regularization constraint of a high resolution image restored based on the input image by using the weight; calculating a reconstruction constraint that is a constraint based on reconstruction of the high resolution image; and restoring the high resolution image from the input image based on the regularization constraint and the reconstruction constraint.

(Supplementary note 10) The image processing method according to supplementary note 9, includes: calculating a gradient of a feature value of a pixel of the input image; calculating a degree of equality in directions of gradient of the feature values; and calculating the weight based on the gradient and a degree of equality in the directions.

(Supplementary note 11) The image processing method according to supplementary note 9 or 10, includes: in an area where magnitude of the gradient is more than a predetermined value, and a degree of equality in directions of the gradient is less than a predetermined value, calculating a weight reduced by the predetermined value.

(Supplementary note 12) The image processing method according to any one of supplementary notes 9 to 11, includes: calculating a necessary constant for representing the regularization term from a high resolution image for learning, a low resolution image artificially generated from the high resolution image, and a calculated weight.

(Supplementary note 13) The image processing method according to any one of supplementary notes 9 to 12, includes: calculating the necessary constant for representing the regularization term from a high resolution image for learning, a low resolution image artificially generated from the high resolution image, a super resolution image generated provisionally, and a calculated weight.

(Supplementary note 14) The image processing method according to any one of supplementary notes 9 to 13, includes: calculating a direction constraint with which an edge direction perpendicular to a gradient direction of a feature value of the input image is smooth in the restored image; and restoring an image by using the direction constraint in addition to the reconstruction constraint and the regularization constraint.

(Supplementary note 15) The image processing method according to any one of supplementary notes 9 to 14, further includes: imposing a limitation so that some of pixels are not used in calculation of the regularization constraint.

(Supplementary note 16) The image processing method according to supplementary note 15, includes: deleting a part of calculated weights.

(Supplementary note 17) A computer-readable non-transitory recording medium embodying a program for an image processing device to perform method, the method includes: determining an area where a feature value of an input image is saved, based on a gradient of a feature value of a pixel of the input image and a direction of the gradient, and calculating a weight for reducing a regularization constraint that is a constraint based on regularization of image processing in the area where the feature value is saved; calculating a regularization constraint of a high resolution image restored based on the input image by using the weight; calculating a reconstruction constraint that is a constraint based on reconstruction of the high resolution image; and restoring the high resolution image from the input image based on the regularization constraint and the reconstruction constraint.

(Supplementary note 18) The computer-readable non-transitory recording medium embodying the program to perform method according to supplementary note 17, the method includes: calculating a gradient of a feature value of a pixel of the input image; calculating a degree of equality in directions of gradient of the feature values; and calculating the weight based on the gradient and a degree of equality in the directions.

(Supplementary note 19) The computer-readable non-transitory recording medium embodying the program to perform method according to supplementary note 17 or 18, the method includes: in an area where magnitude of the gradient is more than a predetermined value, and a degree of equality in directions of the gradient is less than a predetermined value, calculating a weight reduced by the predetermined value.

(Supplementary note 20) The computer-readable non-transitory recording medium embodying the program to perform method according to any one of supplementary notes 17 to 19, the method includes: calculating a necessary constant for representing the regularization term from a high resolution image for learning, a low resolution image artificially generated from the high resolution image, and a calculated weight.

(Supplementary note 21) The computer-readable non-transitory recording medium embodying the program to perform method according to any one of supplementary notes 17 or 20, the method includes: calculating the necessary constant for representing the regularization term from a high resolution image for learning, a low resolution image artificially generated from the high resolution image, a super resolution image generated provisionally, and a calculated weight.

(Supplementary note 22) The computer-readable non-transitory recording medium embodying the program to perform method according to any one of supplementary notes 17 or 21, the method includes: calculating a direction constraint with which an edge direction perpendicular to a gradient direction of a feature value of the input image is smooth in the restored image; and restoring an image by using the direction constraint in addition to a reconstruction constraint and a regularization constraint.

(Supplementary note 23) The computer-readable non-transitory recording medium embodying the program to perform method according to any one of supplementary notes 17 or 22, the method includes: imposing a limitation so that some of pixels are not used in calculation of a regularization constraint.

(Supplementary note 24) The computer-readable non-transitory recording medium embodying the program to perform method according to supplementary note 23, the method includes: deleting a part of calculated weights.

(Supplementary note 25) An image processing device includes: a weight calculation unit that calculates a weight for reducing a regularization constraint that is a constraint based on regularization of image processing in a texture area of an input image; a regularization term calculation unit that calculates the regularization constraint by using the weight in the texture area and not using the weight in an area other than the texture area; and an image restoring unit that restores a high resolution image based on the regularization constraint and a reconstruction constraint that is a constraint based on reconstruction of the high resolution image.

(Supplementary note 26) An image processing method includes: calculating a weight for reducing a regularization constraint that is a constraint based on regularization of image processing in a texture area of an input image; calculating the regularization constraint by using the weight in the texture area and not using the weight in an area other than the texture area; and restoring a high resolution image based on the regularization constraint and a reconstruction constraint that is a constraint based on reconstruction of the high resolution image.

(Supplementary note 27) A computer-readable non-transitory recording medium embodying a program for an image processing device to perform method, the method includes: calculating a weight for reducing a regularization constraint that is a constraint based on regularization of image processing in a texture area of an input image; calculating the regularization constraint by using the weight in the texture area and not using the weight in an area other than the texture area; and restoring a high resolution image based on the regularization constraint and a reconstruction constraint that is a constraint based on reconstruction of the high resolution image.

REFERENCE SINGS LIST

10 Image processing device
11 Image processing device
12 Image processing device
18 Image processing device
20 Reconstruction constraint calculation unit
30 Regularization term calculation unit
31 Regularization term calculation unit
40 Image restoring unit
41 Image restoring unit
50 Weight calculation unit
51 Weight calculation unit
60 Direction constraint calculation unit
70 Reference pixel pruning unit
90 Image processing device
510 Gradient calculation unit
520 Direction calculation unit
530 Weight data calculation unit
810 CPU
820 ROM
830 RAM
840 Internal storage device
850 IO
860 Input equipment
870 Display equipment
880 NIC
890 Storage medium
910 Reconstruction constraint calculation unit
920 Regularization term calculation unit
930 Image restoring unit

What is claimed is:
1. An image processing device comprising:
a CPU; and
a memory that includes a program, wherein
the CPU reads the program from the memory and executes functions as:
a weight calculator that determines an area where a feature value of an input image is saved, based on a gradient of a feature value of a pixel of the input image and a direction of the gradient, and calculates a weight for reducing a regularization constraint that is a con- straint based on regularization of image processing in the area where the feature value is saved;
a regularization term calculator that calculates a regularization constraint of a high resolution image restored based on the input image by using the weight;
a reconstruction constraint calculator that calculates a reconstruction constraint that is a constraint based on reconstruction of the high resolution image; and
an image restorer that restores the high resolution image from the input image based on the regularization constraint and the reconstruction constraint.

2. The image processing device according to claim 1, wherein
the weight calculator comprising:
a gradient calculator that calculates a gradient of a feature value of a pixel of the input image;
a direction calculator that calculates a degree of equality in directions of gradient of the feature values; and
a weight data calculator that calculates the weight based on the gradient and a degree of equality in the directions.

3. The image processing device according to claim 1, wherein
the weight data calculator, in an area where magnitude of the gradient is more than a predetermined value, and a degree of equality in directions of the gradient is less than a predetermined value, calculates a weight reduced by a predetermined value.

4. The image processing device according to claim 1, comprising:
a direction constraint calculator that calculates a direction constraint with which an edge direction perpendicular to a gradient direction of a feature value of the input image is smooth in the restored image, wherein
the image restorer restores an image by using the direction constraint in addition to the reconstruction constraint and the regularization constraint.

5. The image processing device according to claim 1, further comprising:
a reference pixel pruner that imposes a limitation so that some of pixels are not used in calculation of the regularization constraint by the regularization term calculation unit.

6. The image processing device according to claim 5, wherein
the reference pixel pruner deletes a part of weights calculated by the weight calculator.

7. An image processing method for an image processing device comprising:
determining an area where a feature value of an input image is saved, based on a gradient of a feature value of a pixel of the input image and a direction of the gradient, and calculating a weight for reducing a regularization constraint that is a constraint based on regularization of image processing in the area where the feature value is saved;
calculating a regularization constraint of a high resolution image restored based on the input image by using the weight;
calculating a reconstruction constraint that is a constraint based on reconstruction of the high resolution image; and
restoring the high resolution image from the input image based on the regularization constraint and the reconstruction constraint.

8. A computer-readable non-transitory recording medium embodying a program for an image processing device to perform method, the method comprising:
determining an area where a feature value of an input image is saved, based on a gradient of a feature value of a pixel of the input image and a direction of the gradient, and calculating a weight for reducing a regularization constraint that is a constraint based on regularization of image processing in the area where the feature value is saved;
calculating a regularization constraint of a high resolution image restored based on the input image by using the weight;
calculating a reconstruction constraint that is a constraint based on reconstruction of the high resolution image; and
restoring the high resolution image from the input image based on the regularization constraint and the reconstruction constraint.

9. An image processing device comprising:
a CPU; and
a memory that includes a program, wherein
the CPU reads the program from the memory and executes functions as:
a weight calculator that calculates a weight for reducing a regularization constraint that is a constraint based on regularization of image processing in a texture area of an input image;
a regularization term calculator that calculates the regularization constraint by using the weight in the texture area and not using the weight in an area other than the texture area; and
an image restorer that restores a high resolution image based on the regularization constraint and a reconstruction constraint that is a constraint based on reconstruction of the high resolution image.

10. An image processing method for an image processing device comprising:
calculating a weight for reducing a regularization constraint that is a constraint based on regularization of image processing in a texture area of an input image;
calculating the regularization constraint by using the weight in the texture area and not using the weight in an area other than the texture area; and
restoring a high resolution image based on the regularization constraint and a reconstruction constraint that is a constraint based on reconstruction of the high resolution image.

11. A computer-readable non-transitory recording medium embodying a program for an image processing device to perform method, the method comprising:
calculating a weight for reducing a regularization constraint that is a constraint based on regularization of image processing in a texture area of an input image;
calculating the regularization constraint by using the weight in the texture area and not using the weight in an area other than the texture area; and
restoring a high resolution image based on the regularization constraint and a reconstruction constraint that is a constraint based on reconstruction of the high resolution image.

* * * * *